United States Patent [19]

Barge

[11] 4,378,760
[45] Apr. 5, 1983

[54] DEVICE FOR CONTROLLING THE VENTILATING MEANS OF AN INTERNAL COMBUSTION ENGINE

[75] Inventor: Jean Barge, Montbeliard, France

[73] Assignee: Aciers et Outillage Peugeot, Audincourt, France

[21] Appl. No.: 273,567

[22] Filed: Jun. 16, 1981

[30] Foreign Application Priority Data

Jun. 16, 1980 [FR] France ................. 80 13299

[51] Int. Cl.³ .............................. F01P 5/02
[52] U.S. Cl. .................... 123/41.12; 123/41.49; 318/471
[58] Field of Search ............... 123/41.1, 41.11, 41.12, 123/41.33, 41.49; 318/471, 473

[56] References Cited

U.S. PATENT DOCUMENTS 2,729,203  1/1956  Prendergast .............. 123/41.33
3,823,363  7/1974  Hill .......................... 123/41.49
4,313,402  2/1982  Lenhoff et al. ............ 123/41.12

FOREIGN PATENT DOCUMENTS

2806708  8/1978  Fed. Rep. of Germany ... 123/41.12

Primary Examiner—William A. Cuchlinski, Jr.
Attorney, Agent, or Firm—Sughrue, Mion, Zinn, Macpeak and Seas

[57] ABSTRACT

The device comprises a temperature sensor placed in contact with a heat-carrying fluid circulating in the engine and a control device responsive to the sensor for the purpose of supplying power to the motor or motors driving the ventilator or ventilators in accordance with variations in the temperature of the heat-carrying fluid. The temperature sensor comprises a component which is sensitive to a continuous range of temperatures and this component is connected, as an input element, to a continuous regulating loop regulating the power supplied to the motor or motors. This loop comprises a threshold circuit which determines the lower value of the temperature range.

18 Claims, 12 Drawing Figures

DEVICE FOR CONTROLLING THE VENTILATING MEANS OF AN INTERNAL COMBUSTION ENGINE

The present invention relates to the cooling of internal combustion engines and more particularly to a device for controlling one or more motor-fans for cooling the engine, these motor-fans being for example associated with a radiator.

Beyond a certain power, an internal combustion engine must be cooled by means of a heat-carrying fluid in such manner that this fluid, after having received heat in the engine, can exchange this heat with the surrounding atmosphere in a radiator. In order to achieve a sufficient heat exchange, it is furthermore usual to associate a motor-fan with the radiator so that a stream of air can be forced through this radiator.

Most often, the motor-fan is automatically controlled by means of an on-off loop which comprises in particular an electric switch which is responsive to the temperature and is placed in the radiator and electrically connected in the circuit of the motor so as to supply power to the latter or cut off this supply in accordance with the temperature of the fluid flowing through the radiator. Another manner of regulating the temperature of the heat-carrying fluid resides in providing, between the motor and the fan, an electromagnetic clutch which is applied or released in accordance with the opening or closing of the thermoswitch.

Such a control device consequently operates in a discontinuous manner since the thermoswitch operates essentially at the extreme temperatures of the range of temperatures for which it is intended. In other words, the switch closes for driving the fan when an upper temperature is reached and opens so as to render the fan inoperative when this temperature becomes equal to the lower value of the temperature range.

At the present time there is an increasing tendency to operate internal combustion engines at a temperature which is as high as possible, since it has been found that, under these conditions, the engine has an improved efficiency. This is why the constructors of these engines usually mix with the heat-carrying fluid, usually water, products which have, in addition to the antifreeze function, the effect of raising the boiling point, the cooling circuit being moreover put under pressure so as to still further raise the boiling point of the water.

It will be clear that the correct operation of such a cooling system in large part depends on the thermoswitch. Now, it has been found in practice that these switches cannot be mass-produced for a temperature range which has narrow tolerances. In other words, some of these thermoswitches may have a temperature range whose upper value is excessively high so that, when they are inserted in a cooling circuit of an internal combustion engine, the latter will operate at an excessively high upper temperature notwithstanding the arrangements for raising the boiling temperature of the water. In such a case, the engine would not operate in a satisfactory manner.

A second drawback is added to this first drawback of the control devices of the prior art. Indeed, it is of course desirable to cool the engine by consuming as small amount of power as possible, since this power is supplied by the engine itself. Now, in the case of an automobile vehicle, and above all at high running speeds of the engine, the speed of the vehicle can reduce the temperature to a value between the extreme values of the temperature range of the thermoswitch.

However, in view of the fact that, under these conditions of high running speed, the lower temperature of this temperature range is not yet reached, the fan continues to operate unnecessarily and there is a corresponding loss of power.

While these drawbacks are disadvantageous for water-cooled engines, the power losses are still higher in the case of air-cooled engines, since the latter are cooled by a fan which is directly and continuously coupled to the crankshaft of the engine.

An object of the invention is to provide a control device of the type mentioned hereinbefore in which the aforementioned drawbacks are avoided.

The invention accordingly provides a device for controlling the ventilating means of an internal combustion engine comprising a temperature sensor placed in contact with a heat-carrying fluid flowing in the engine and control means responsive to said sensor for supplying power to the motor or motors driving the ventilating means in accordance with the variations in the temperature of the heat-carrying fluid, wherein said temperature sensor comprises a component sensitive to a continuous range of temperatures, this component being connected as an input element to a continuous regulating loop of the power supplied to the motor or motors of the ventilating means, said loop comprising a threshold circuit which determines the lower value of said temperature range.

Said temperature sensor is preferably formed by a thermistor.

Owing to these features, it is possible to arrange that the operation of the ventilating means is adapted to each condition of operation of the engine throughout the temperature range to which the sensor is sensitive. Thus, whatever be the circumstances, the ventilating means only consume the power required for achieving the desired temperature. This is particularly true during the period for heating up the engine after starting the latter under cold conditions, since the regulation of the temperature only starts to operate beyond the threshold value determined by the threshold circuit.

Further, the elimination of the thermoswitch results in greater safety in the upper operating region since the temperature sensors, such as the thermistors, have higher precision for a cost comparable to that of conventional thermoswitches.

In a particular embodiment, the heat-carrying fluid in which the temperature sensor is placed is the engine cooling water, the sensor being preferably placed in the radiator of the engine.

In another embodiment, the heat-carrying fluid in which the temperature sensor is placed is the lubricant of the engine, the sensor being then for example placed in the oil sump of the engine or in an oil return circuit leading to this sump. This case is particularly applicable to air-cooled engines which were heretofore cooled by a fan directly coupled to the crankshaft. Consequently, the invention avoids the losses of energy resulting from said prior arrangement in which the ventilating requirements are less at high speed and greater at low speed or when the vehicle is stationary.

Figure 1:
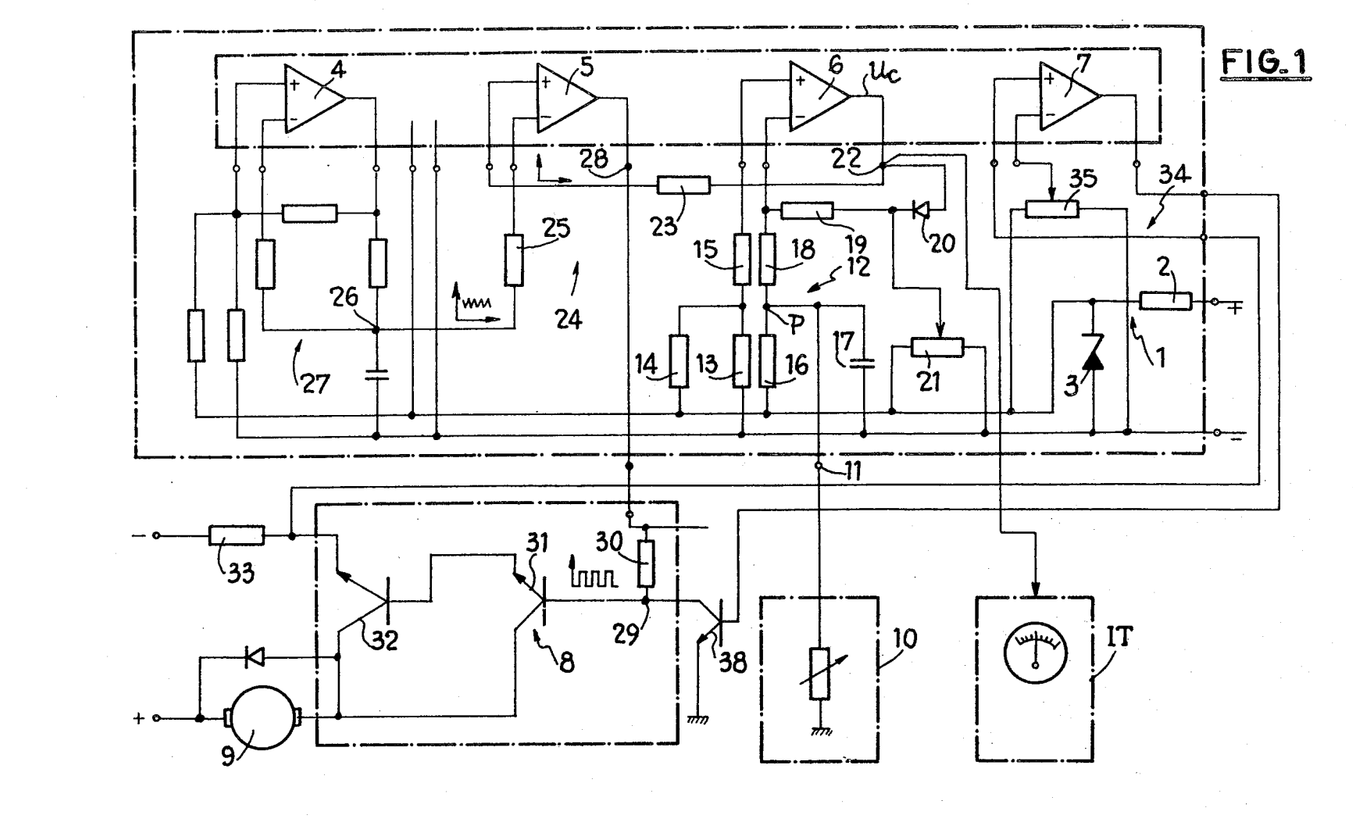
FIG. 1 is an electric diagram of a control device according to the invention.

Further features of the invention will be apparent from the ensuing description which is given solely by way of example with reference to the accompanying drawings in which:

FIG. 1 shows a control device according to the invention for supplying power to a single motor-fan, here employed for the cooling circuit of a water-cooled internal combustion engine of for example an automobile vehicle.

A voltage stabilizer 1 stabilizes by means of a resistor 2 and a Zener diode 3, a voltage of 12 volts for example supplied by a battery of accumulators (not shown).

This stabilizer supplies power in parallel to the various elements of the control device and in particular the operational amplifiers 4, 5, 6 and 7 of an integrated circuit and the control of a power circuit 8 which is connected to the drive motor 9 of the fan. This power circuit 8 is supplied with power directly by the source of voltage.

The control device comprises a temperature sensor 10 which is in the presently-described embodiment a thermistor which here has a negative temperature coefficient. This thermistor is mounted in the radiator (not shown) of the cooling circuit of the internal combustion engine. The thermistor 10 is connected through a connection terminal 11 to a comparator 12 whose active element is the operational amplifier 6.

This comparator 12 comprises first of all a voltage divider formed by resistors 13 and 14 the junction point of which is connected to the non-inverting input of the amplifier 6 through a resistor 15.

The terminal 11 is connected to the thermistor 10 and connected to the junction point P of the series connection of a resistor 16 and a capacitor 17. This junction point P is connected to the inverting input of the amplifier 6 through a resistor 18.

The amplifier 6 is provided with a negative feedback circuit comprising a resistor 19 and a diode 20, the junction point between these two components being connected to the slider of a potentiometer 21 whose extreme points are respectively connected to the terminals of the voltage stabilizer 1. The output 22 of the operational amplifier 6 is connected to the non-inverting input of the operational amplifier 5, which constitutes the active element of another comparator 24, through a resistor 23.

The inverting input of the amplifier 5 is connected, through a resistor 25, to the output 26 of a triangular signal oscillator 27 of conventional construction and comprising the operational amplifier 4 as the active element.

The output 28 of the operational amplifier 5 is connected to the input 29 of the power circuit 8 through a resistor 30. More precisely, the input 29 is the base of a first amplification transistor 31 which is connected in a DARLINGTON circuit which itself controls a power transistor 32 directly supplying power to the armature of the motor 9. This supply circuit comprises in series also a current-measuring resistor 33 which furnishes the input signal for a protection circuit 34 protecting against overcurrents, the active element of which is the operational amplifier 7. Indeed, the junction between the emitter of the transistor 32 and the resistor 33 is connected to the non-inverting input of the amplifier 7, the inverting input of this amplifier being connected to the slider of a potentiometer 35 whose extreme points are connected to the output terminals of the voltage stabilizer 1. The potentiometer 35 determines the threshold of the current allowed to pass through the supply circuit of the motor 1.

The output terminal 22 of the amplifier 6, which furnishes a voltage $U_c$ which is a function of the temperature detected by the thermistor 10, is connected to a temperature indicator IT which, if the control device is associated with an automobile vehicle, would be advantageously placed on the dashboard. Note that, with this arrangement, the thermistor usually required for measuring the temperature of the cooling water and for indicating the measured value on the dashboard may be eliminated, the thermistor 10 thus performing the double function of a sensor for the control circuit and the temperature display means.

Figures 2, 6:
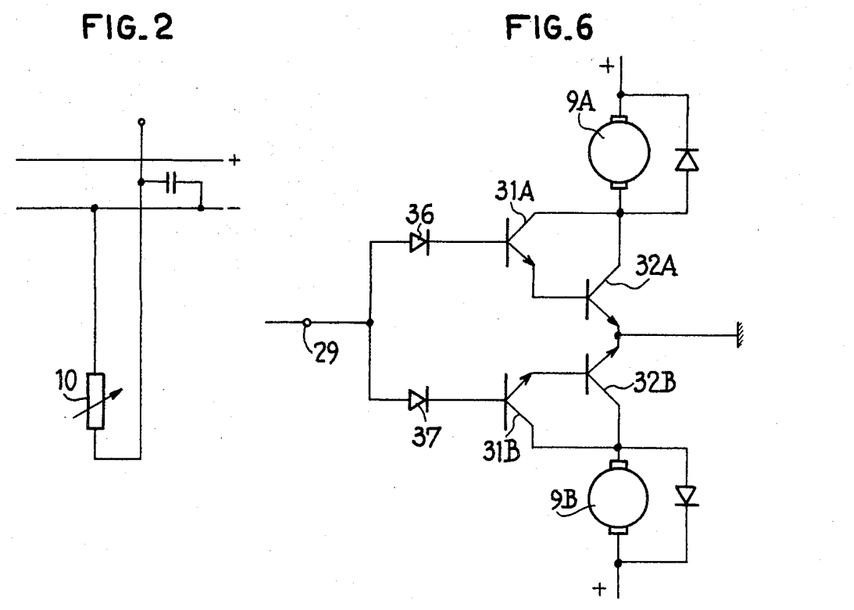
FIG. 2 shows a modification of a detail of the diagram of FIG. 1.
FIG. 6 shows a detail of a modification of the control device arranged to supply power to two driving motors.

FIG. 2 shows a modification of the connection of the thermistor 10 in the circuit just described. In this case, one of the terminals of the thermistor 10 is not connected to ground as shown in FIG. 1, but to the negative terminal of the control circuit. By means of this arrangement it is possible to eliminate parasites which might arise in the mass of the vehicle for example, and is the only possible arrangement when the thermistor is mounted in a housing of plastics material which is non-conductive of electricity.

Figure 3:
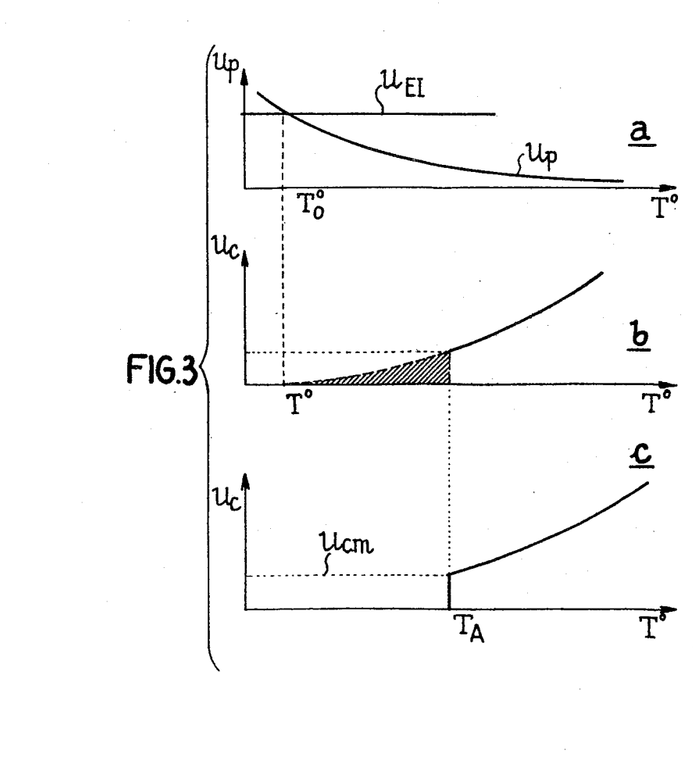
FIG. 3 is a diagram showing several curves illustrating the operation of the device according to the invention.
Figure 4:
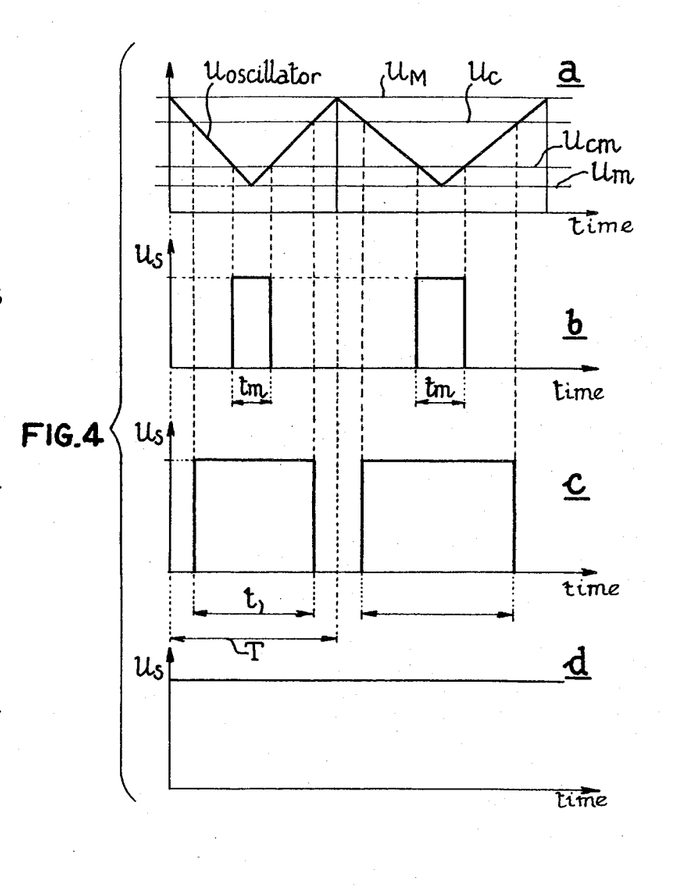
FIG. 4 is a diagram also showing several curves of the signals occurring in this control device.
Figure 5:
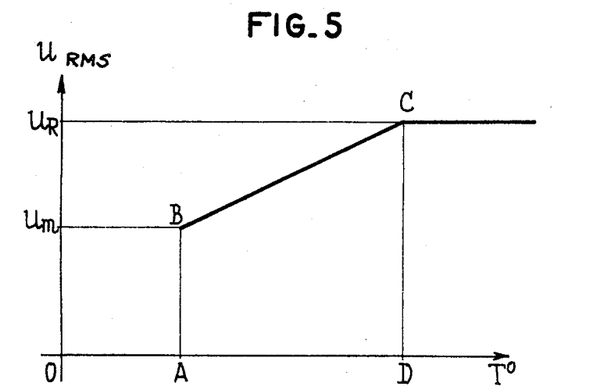
FIG. 5 is also a diagram showing a curve of operation of the device according to the invention.

The operation of the control circuit just described will now be examined by means of the diagrams shown in FIGS. 3 to 5.

The temperature variations detected by the thermistor 10 are converted into voltage variations in the following manner.

The thermistor 10 and the resistor 16 constitute a variable voltage divider whose output voltage $U_p$ appears at the junction point P. This voltage (FIG. 3a), which represents the temperature of the cooling circuit, is amplified by the operational amplifier 6 beyond a threshold determined by the value of a fixed voltage $U_{EI}$ applied to the non-inverting input of this amplifier and delivered by the voltage divider having the resistors 13 and 14. In this way, the system only starts to operate beyond a certain predetermined temperature $T_o$. The regulation band consequently does not operate until this temperature $T_o$ has been reached (the case of starting up the internal combustion engine under cold conditions).

The output voltage $U_c$ of the amplifier 6 shown in FIG. 3b is subjected to the negative feedback of the circuit which comprises the resistor 19 and the diode 20 and in which there is injected a regulating voltage coming from the potentiometer 21 and adapted to polarize the diode 20 in the opposite direction. Consequently, the voltage $U_c$ appears at the junction 22 only beyond a certain threshold value and the undesired part (cross-hatched in FIG. 3b) of this voltage is consequently eliminated. The voltage at the junction 22 is consequently as shown by the curve of FIG. 3c, the lower value of this voltage being designated by $U_{cm}$.

The voltage at the junction 22 is applied to the non-inverting input of the amplifier 5 so as to effect a comparison with the output signal of the oscillator 27 which is applied to the inverting input of this amplifier. The minimum value of the triangular voltage issuing from the oscillator being equal to $U_m$ (FIG. 4a), the value of the voltage $U_{cm}$ is so chosen by the regulation of the potentiometer 21 that $U_{cm} > U_m$.

The comparison of the input voltages of the amplifier 12 has for effect to produce pulse trains $U_s$ the frequency of which is that of the oscillator 27 and the pulse width of which is determined by the value of the voltage $U_c$ which varies within the range from $U_{cm}$ to $U_M$ as a function of the temperature.

The minimum cyclic ratio (FIG. 4b) of the pulse train is:

$$S = tm/T$$

wherein:
S = the cyclic ratio
tm = the minimum duration of the pulses
T = duration of the period of the triangular signal
When $U_M > U_C > U_{cm}$ (FIG. 4c), the cyclic ratio S varies with t:

$$S = t/T$$

When $U_c > U_M$ (FIG. 4d), the voltage $U_s$ appears continuously at the output 28 of the amplifier 5.

Thus it can be seen that the output terminal 29 delivers a signal of variable energy which is a function of the cyclic ratio S which varies between tm/T% and 100% and is piloted by the temperature of the cooling water of the engine.

As the energy appearing at the terminal 29 is of low level, it is insufficient to directly control a power circuit for the motor 9 and is consequently amplified by the transistors 31 and 32 so that the motor 9 will receive through the transistor 32 an energy proportional to the energy at the terminal 29 and varying in the ratio of from t/T to 1 relative to the energy capable of being furnished by the power supply, such as the supply network of the vehicle.

FIG. 6 shows that it is possible to control two motors 9A and 9B by means of respective transistors 31A, 31B and 32A, 32B with the insertion of separation diodes 36 and 37 in the circuit for safety reasons.

If more than two motors are desired to be controlled, it is advantageous to amplify first of all the signal of the terminal 29 before controlling n power circuits such as those shown in FIG. 6.

FIG. 5 shows the curve of regulation of the RMS voltage applied to the motor 9 (FIG. 1) as a function of the temperature.

The circuitry described above easily permits varying (1) the gap AD (temperature range), (2) the point A (the desired start of the rotation of the motor of the fan), (3) the value $U_m$ which is the minimum voltage of the start of the rotation, and (4) the temperature (point D) at which the circuitry commands full speed.

The values of the resistors 13, 14, 16 and 19, of the diode 20 and of the potentiometer 21 determine the threshold of the start of rotation (point A) at voltage $U_{cm}$ the RMS value of which is:

$$U_{cm} = U_R S = U_R(tm/T)$$

The resistive components of the oscillator 27 determine the value of the voltage $U_m$ which, when compared with the voltage $U_c$, can give a constant voltage (FIG. 4d) instead of a train of pulses.

In most cases, the potentiometer 21 permits a variation of the shape of the curve of FIG. 5 without great modification of the other components. The described circuitry can therefore be mass-produced for very different utilizations with internal combustion engines of any type.

It may be of utility to limit the value of the current supplied by the power circuit 8:
in order to avoid the destruction of this circuit if its output is accidentally shorted;
in order to avoid an excessively large dimensioning of the transistor or transistors 31 to enable them to resist the high peak values of the current when starting up the motor or motors 9.

It is possible to accept a reduction in the current peak value when starting up since a motor-fan does not require great torque at this moment.

The limitation of the current is achieved by a comparison in the amplifier 7 of the voltage of the measurement of the current taken off the terminals of the weak resistor 33 with an adjustable reference voltage produced on the slider of the potentiometer 35.

If the measured voltage is excessively high and exceeds the reference voltage, the amplifier 7 unblocks a transistor 38 and this deviates to ground all or part of the signal appearing at the terminal 29. Consequently, the transistor 31 will be rendered non-conductive and the supply of power to the motor 9 stopped.

Figures 7, 8:
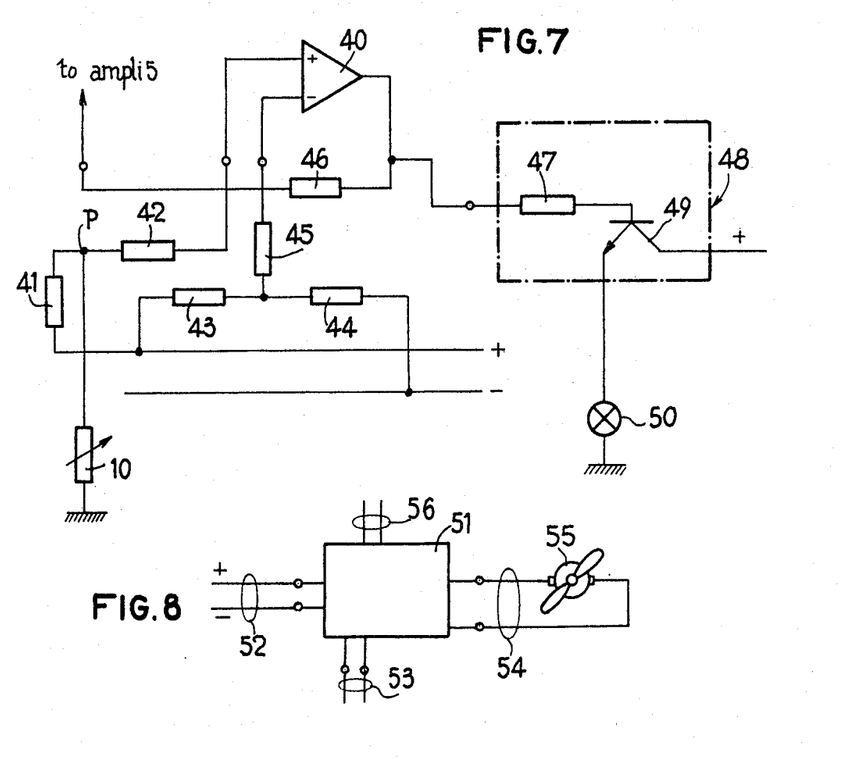
FIG. 7 is a diagram showing a detail of the control device which may be used as an accessory for producing a warning signal.
FIG. 8 is a very simplified diagram of this control device employed for supplying power to a single motor-fan.

FIG. 7 shows the diagram of a circuit for protecting the circuitry shown in FIG. 1 and which may complete the latter or replace the current-limiting circuitry whose operation has just been described. Indeed, the destruction of the thermistor Th, the disconnection of the circuit at the junction point P (FIG. 1) or any break in the circuit of FIG. 2, eliminates from the control the temperature information. The motor-fan 9 can no longer be started up, the internal combustion engine rapidly overheats and the complete destruction thereof is very rapid.

The circuitry shown in FIG. 7 may be of absolute safety for safeguarding the internal combustion engine by supplying full voltage to the motor-fan or motor-fans in the event of the elimination of the signal coming from the thermistor.

The protection circuit of FIG. 7 comprises an operational amplifier 40 whose non-inverting input is connected to a voltage divider comprising the resistor 41 and the measuring thermistor 10, the intermediate point P of this divider being connected to the input in question through a resistor 42. The inverting input of the amplifier is connected to a voltage divider comprising resistors 43 and 44 which furnish to said input a fixed reference through a resistor 45. The output of the amplifier 40 is connected, through a resistor 46, to the non-inverting input of the operational amplifier 5 (FIG. 1) and to another resistor 47 which is part of a signalling circuit 48 comprising an amplifying transistor 49 which actuates a signalling light 50 or any other like warning means.

The amplifier 40 acts as a comparator. If the circuit of the thermistor 10 is broken, there is no longer any voltage at the junction P or at the non-inverting input of the amplifier whose output passes to 1 state and applies to the non-inverting input of the amplifier 5 a voltage $U_{break} > U_m$, which places the output of the amplifier in the state corresponding to full conduction of the transistor 32.

The motor-fan or motor-fans then rotate permanently at full speed and safeguard the life of the internal combustion engine whose operating temperature drops below the normal temperature, which can in no way be harmful to the engine.

This device is advantageously completed by a light or sound warning means 50 which are controlled by the transistor 49 and are located in the driving compartment of the vehicle or on the control panel of the internal combustion engine so as to warn the driver or operator of the detected deficient operation.

The signalling circuit 48 is advantageously supplied with power directly by the battery so as to be independent of a break-down in the main circuit of FIG. 1.

FIG. 8 shows a first practical embodiment of the invention grouping in a single unit 51 all of the circuits described hereinbefore, i.e. the circuits effecting the control, power and safety functions. Under these conditions, the unit comprises two supply terminals 52, two measurement-taking terminals 53 connected to the thermistor 10, two output terminals 54 leading to the motor-fan 55 and two defective operation signalling terminals 56 connected to warning means. Such a single unit is appropriate for absorbed powers which do not exceed for example 60 watts.

Figure 9:
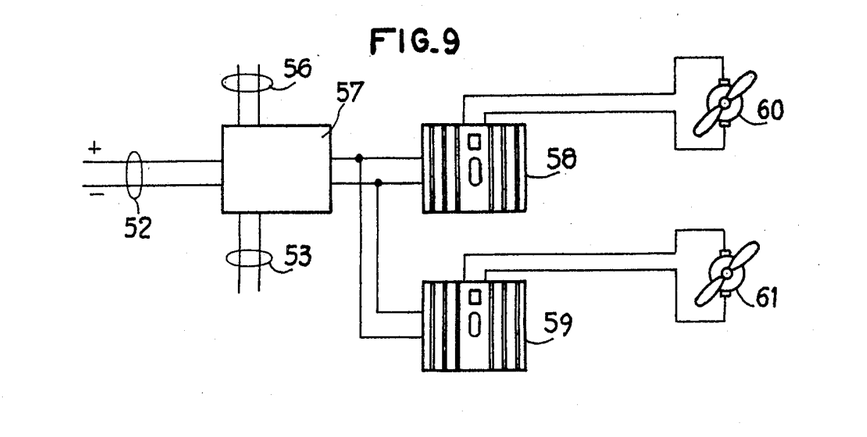
FIG. 9 is also a very simple diagram of a control device for supplying power to two motor-fans.

FIG. 9 shows an embodiment of the invention for higher absorbed powers. In this case, a unit 57 encloses the circuits performing only the control and safety functions, the power functions being performed in two distinct power units 58 and 59 for purposes of heat dissipation, each power unit supplying a separate fan 60 or 61. These power units may thus absorb, each one, up to 300 watts.

Figure 10:
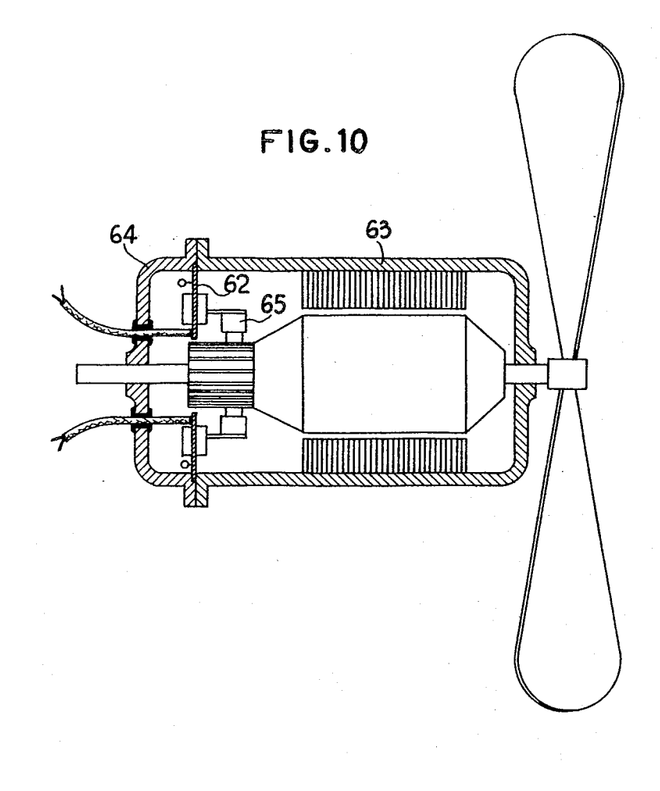
FIG. 10 shows the placement of a control device in the motor of a motor-fan unit.
Figures 11, 12:
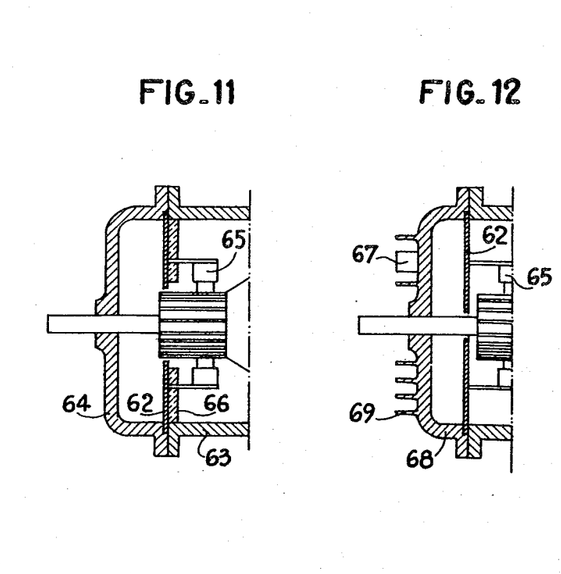
FIGS. 11 and 12 show two modifications of the arrangement shown in FIG. 10.

FIGS. 10 to 12 show how the device according to the invention may be included in the motor driving the fan.

The circuit is formed on a printed circuit board 62 which is fixed between the case 63 of the motor and one of its end caps 64 covering the commutator or collector part of the motor. In addition to the circuit of the invention, this board may advantageously support the brushes 65 and transmits the supply to the motor. The side of the board 62 facing inwardly is advantageously insulated so as to avoid contact with conductive dust coming from the brushes 65 (FIG. 10).

In FIG. 11, the board 62 is separated from a brush-carrying plate 66 and thus avoids the difficulty just mentioned in another manner.

FIG. 12 shows an arrangement which facilitates the dissipation of heat from the power components 67 of the device. These power components are advantageously mounted on the outside of a cap 68 provided with cooling fins 69, the printed circuit board 62 being mounted in the manner shown in FIG. 10.

Note that the operational amplifiers 4 to 7, and possibly the amplifiers 4, 5, 6 and 40, may be formed by one and the same integrated circuit which is commercially available and correspondingly reduces the size of the assembled circuitry.

In the embodiment described with reference to FIGS. 1 to 7, the control device is employed for a water-cooled internal combustion engine.

The invention is also applicable to air-cooled engines, the thermistor 10 then being placed in the lubricating circuit of the engine, e.g. in the oil sump or at the outlet of the oil circuit of the engine.

Having now described my invention what I claim as new and desire to secure by Letters Patent is:

1. A device for controlling ventilating means of a radiator of an internal combustion engine comprising a temperature sensor placed in contact with a heat-carrying fluid circulating in said engine and control means responsive to said sensor for supplying power to motor means drivingly connected to the ventilating means as a function of variations in the temperature of the heat-carrying fluid, said temperature sensor comprising a component including a thermistor sensitive to a continuous range of temperatures and a continuous regulating loop for regulating the power supplied to said motor means, said temperature sensitive component being connected, as an input element, to said loop, and said loop comprising a threshold circuit determining a lower value of said temperature range, and an operational amplifier which is arranged as a comparator and has an input connected to said temperature sensitive component, said operational amplifier being moreover provided with a negative feedback circuit having a negative feedback level which is defined by a fixed reference voltage which determines a threshold beyond which said loop effects the temperature regulation.

2. A device according to claim 1, wherein said negative feedback circuit comprises a diode and a reference voltage source which polarizes the diode in the opposite direction.

3. A device according to claim 2, wherein said operational amplifier has an output which is connected to a power circuit through a pulse generator the cyclic ratio of which it controls.

4. A device according to claim 1, wherein said operational amplifier has an output which is connected to a power circuit through a pulse generator the cyclic ratio of which it controls.

5. A device according to claim 4, wherein said pulse generator comprises an oscillator forming a triangular voltage and a comparator for comparing said voltage with a voltage appearing at said output of said operational amplifier, the comparator having an output which is connected to a power circuit for supplying power to said motor means.

6. A device according to claim 5, comprising a circuit for limiting the value of the current in said motor means, said limiting circuit comprising an element for detecting said current and means for inhibiting the flow of the current in said motor means when said detecting element detects a current value exceeding a predetermined value.

7. A device according to claim 1, wherein said operational amplifier has an output which is connected to a temperature indicator located on a control panel.

8. A device according to claim 7, wherein said engine is part of a vehicle and said panel is a dashboard of said vehicle.

9. A device according to claim 7, comprising a circuit for limiting the value of the current in said motor means, said limiting circuit comprising an element for detecting said current and means for inhibiting the flow of the current in said motor means when said detecting element detects a current value exceeding a predetermined value.

10. A device according to any one of the claims 1 or 4 to 9, comprising a circuit for protecting against the disconnection of connections to said temperature sensitive component.

11. A device according to any one of the claims 4 to 7, comprising a circuit for protecting against the disconnection of connections to said temperature sensitive component, said protection circuit comprising a reference voltage source, a circuit capable of detecting a potential at terminals of said temperature sensitive component, said source and said detecting circuit being connected to a comparator having an output which is connected to said pulse generator for bringing the cyclic ratio of the pulses back to a maximum value.

12. A device according to claim 11, wherein said protection circuit is connected to a signalling circuit for producing a warning signal when said temperature sensitive component is disconnected.

13. A device according to any one of the claims 1 or 2 to 9, wherein said sensor is placed in the radiator of a water-cooled internal combustion engine.

14. A device according to any one of the claims 1 or 2 to 9, wherein said sensor is placed in a lubrication circuit of an internal combustion engine.

15. A ventilating unit for an internal combustion engine, said unit comprising fan means, motor means drivingly connected to said fan means, and a device for controlling operation of said motor means and comprising a temperature sensor placed in contact with a heat-carrying fluid circulating in said engine and control means responsive to said sensor for supplying power to said motor means as a function of variations in the temperature of the heat-carrying fluid, said temperature sensor comprising a component sensitive to a continuous range of temperatures and a continuous regulating loop for regulating the power supplied to said motor means, said temperature sensitive component being connected, as an input element, to said loop, and said loop comprising a threshold circuit determining a lower value of said temperature range, and wherein said motor means have a case and said control device is mounted on a printed circuit board disposed in said case.

16. A unit according to claim 15, wherein said motor means have a case and a cap closing said case, and said control device includes a power circuit which is mounted on said cap, which cap is provided with cooling fins.

17. A unit according to claim 15, wherein said board is adapted to support brushes of said motor and protecting means are combined with said board for avoiding contact of said board with dust emanating from said brushes.

18. A unit according to claim 15, wherein said fan means and said motor means are distinct motor-fans and said control device comprises a plurality of power circuits which are controlled simultaneously and in parallel and are connected to supply power to said distinct motor-fans.

* * * * *